FIG. 1a.

Inventors, James B. Henderson, Arthur L. Perham; by Moakley & Gill, Attorneys

Dec. 26, 1933.  J. B. HENDERSON ET AL  1,940,681
FIRE CONTROL SYSTEM FOR ANTIAIRCRAFT GUNS
Filed Feb. 12, 1927   5 Sheets-Sheet 2

Fig.1b.

Inventors
James B. Henderson
Arthur L. Perham
By Moakley & Gill
Attorneys

Dec. 26, 1933.   J. B. HENDERSON ET AL   1,940,681
FIRE CONTROL SYSTEM FOR ANTIAIRCRAFT GUNS
Filed Feb. 12, 1927   5 Sheets-Sheet 3

Inventors
James B. Henderson
and Arthur L. Perham
By Moakley & Gill
Attorneys

Dec. 26, 1933.        J. B. HENDERSON ET AL        1,940,681
FIRE CONTROL SYSTEM FOR ANTIAIRCRAFT GUNS
Filed Feb. 12, 1927        5 Sheets-Sheet 4

Inventors
James B. Henderson
and Arthur L. Perham
By Moakley & Gill
Attorneys

UNITED STATES PATENT OFFICE 1,940,681

FIRE CONTROL SYSTEM FOR ANTI-AIRCRAFT GUNS

James Blacklock Henderson, Blackheath, London, and Arthur Leonard Perham, Thames Ditton, England Application February 12, 1927, Serial No. 167,832, and in Great Britain February 16, 1926

39 Claims. (Cl. 235—61.5)

Our invention relates to anti-aircraft gunnery and has for its object the improvement of the accuracy of firing at aircraft targets by eliminating approximations used in prediction mechanism and by arranging for continuous operation of the director sight and predictor. The invention relates more especially to improvements in the predictor mechanism, (1) to eliminate approximations to the mathematical formulæ involved in prediction, (2) to make a correct allowance for the speed of the firing ship for naval use, (3) to make a correct allowance for wind, (4) to provide a ready check between the course and speed of the target and the angular velocities of the line of sight so that the predictor may be operated from either data, and (5) to facilitate the continuous setting of the predictor from the director sight.

In anti-aircraft gunnery it is customary to assume that the target is flying at constant height, course and speed during the short interval of time involved in prediction and that the height is known by actual measurement. We also make the same assumptions.

In the following description the conventional nomenclature will be used, the vertical plane through the sight and target being called the vertical sight plane.

As the target moves in its course the vertical sight plane rotates in azimuth about a vertical axis through the observing instrument unless the target is flying in that plane. We resolve the target speed into two horizontal components in and perpendicular to the vertical sight plane, the former of which we call the "Enemy speed towards" (or E. S. t.) which will be negative if the enemy is receding, and "Enemy speed across" (or E. S. a.) reckoned positive from right to left. The component angular velocities of the line of sight to the target we denote "$e$" in the vertical plane and "$b$" in azimuth; thus "$b$" is the angular velocity of the vertical sight plane. Let $S_1$ denote the present angular elevation of the line of sight and $S_2$ the future angular elevation, that is to say the elevation which it will have by the time the projectile reaches the target. Let the height of the target be noted by H, then—

Enemy speed towards (E. S. t.) $= He/\sin^2 S_1$  (1)

Enemy speed across (E. S. a.) $= Hb/\tan S_1$  (2)

Figure 11:
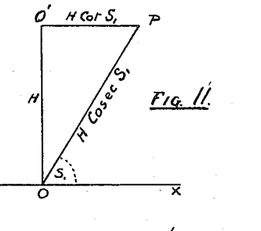
Fig. 11 is a diagram illustrating the derivation of Equations (1) and (2).

Fig. 11 illustrates the derivation of Equations (1) and (2). It represents a side view of the vertical sight plane, O being the sighting station on the ground OX, P the target at a height H above the ground and O' a point vertically above O in the horizontal plane of the target. Angle POX is $S_1$. The angular velocity of OP round O is $e$ and that of O'P in the horizontal plane round O' is $b$.

Then E. S. t. $= -\dfrac{d}{dt}(O'P)$ $= -\dfrac{d}{dt}(H \cdot \cot S_1)$ $= +H \cdot \csc^2 S_1 \cdot \dfrac{dS_1}{dt}$ $= He \cdot \csc^2 S_1$ $= He/\sin^2 S_1$  (1)

The reason for the minus sign in the first line is that if E. S. t. is towards O' then it is positive and $\dfrac{d}{dt}(O'P),$ being a decrement, is negative, while conversely if E. S. t. is away from the point O' it is negative and $\dfrac{d}{dt}(O'P)$ is an increment and positive. That is to say, $\dfrac{d}{dt}(O'P)$ is always opposite in sign to E. S. t.

Again, E. S. a. $= O'P \times$ angular velocity of O'P about O'
$= H \cdot \cot S_1 \times b$
$= Hb/\tan S_1$  (2)

The external ballistics of the flight of the particular shell used may be grouped in curves in a number of different ways. The three variables which we prefer to use are H, the height of the target, $t$ the time of flight of the shell and (A. V. h.) the average component velocity of the shell in the horizontal plane. Let Z be the azimuthal deflection of the line of sight in time $t$. We have deduced the following equations connecting these variables;—

$\cot S_1/\cot S_2 = $ (E. S. t.)$/$(A. V. h.) $+\cos Z$  (3)

$\sin Z = $ (E. S. a.)$/$(A. V. h.)  (4)

Figure 12:
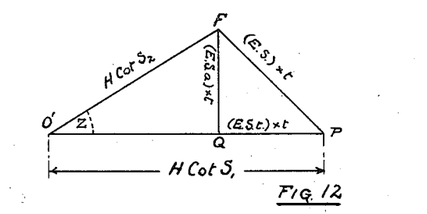
Figs. 12, 13 and 14 are other diagrammatic views related to the derivation of Equations (3) and (4).
Figure 13:
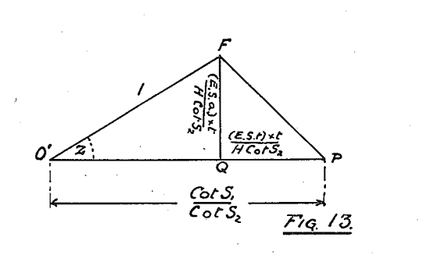
Figure 14:
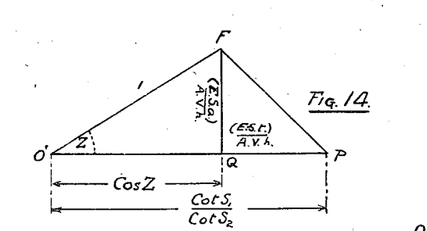

Figs. 12, 13 and 14 show the derivation of Equations 3 and 4.

In these figures O' and P are the same as in Fig. 11 and F represents the future position of the target after the lapse of time of flight, $t$, of the shell in travelling from O to F, the triangle O'PF therefore lying in the horizontal plane of flight of the target.

Draw FQ at right angles to O'P. PF is the product of the target speed and the time of flight of the shell, i. e. (E. S.) $\times t$. Similarly QF is (E. S. a.) $\times t$ and QP is (E. S. t.) $\times t$. O'P is H.cot $S_1$ as in Fig. 11 and O'F is H.cot $S_2$. We reduce the scale of the triangle O'PF by dividing each side by H.cot $S_2$, O'F thus becoming unity. The resultant values are shown in Fig. 13.

Now the average horizontal velocity of the shell (A. V. h.) in travelling from O to F is O'F/$t$ or H.cot $S_2/t$, hence by substituting A. V. h. for H.cot $S_2/t$ in Fig. 13 we have the values given in Fig. 14, in which QF becomes (E. S. a.)/A. V. h. and QP becomes (E. S. t.)/A. V. h. Also since O'F is unity and the angle FO'Q is Z, O'Q is equal to cos Z.

Then since $O'P = QP + O'Q$ $$\cot S_1 / \cot S_2 = (E. S. t.)/A. V. h. + \cos Z \quad (3)$$

$$\text{and } \sin Z = QF = (E. S. a.)/A. V. h. \quad (4)$$

Formulæ (1) to (4) are mathematically exact, assuming constant height, course and speed of the target during the time of flight of the shell.

So far as our predictor mechanism is concerned H, $S_1$, $e$ and $b$ are known, the first being measured by the height-finder, and the others by the sight or by an angular velocity meter. We have designed our predictor mechanism to solve the above equations accurately, giving from these data the values of $S_2$, Z and $t$ which we may transmit directly to the guns. Instead of transmitting $S_2$, however, it may be preferable to transmit quadrant elevation and we provide mechanism for the purpose. Also instead of transmitting Z we may transmit the future angle of gun bearing which we shall denote by $B_2$, the present angle of bearing of the sight being denoted by $B_1$. Hence $B_2 = B_1 + Z$.

In providing the mechanical means for solving Equation (3) we have had to evolve a special form of mechanism for coupling two shafts together so that the cotangents of their angles of rotation are always in a definite ratio, the value of this ratio being capable of adjustment to any desired amount. The ratio is determined by the mechanism working to Equation (3) and the special coupling mechanism gives the angle $S_2$ when the angle $S_1$ and the ratio of the cotangents given by Equation (3) are set on the appropriate elements of the predictor mechanism. A drum turning proportionately to the angle $S_2$ and provided with height curves co-acts with other elements proportionately to either the fuse setting number or to the time of flight, according to which information is preferred and to the consequent plotting of the curves, as hereinafter explained more fully.

For solving Equation (1) by mechanism we have provided a convenient means for generating $\sin^2 S_1$ by a simple crank-pin and crosshead device.

We make corrections for the speed of the firing ship and for the wind as follows. In the absence of both these the above equations give the correct position of the gun relatively to the line of sight to the target. When the firing ship is moving through still air the initial direction of the trajectory is fixed by the direction of the axis of the gun, and the only effect on the trajectory introduced by the motion of the ship is that due to the relative wind which the motion of the ship causes. Immediately after leaving the muzzle of the gun the projectile sets out upon a spiral precessional motion, not round the axis of the gun but round the direction of relative motion of projectile and air, and the subsequent motion takes place relatively to the air. We therefore treat the motion of the ship as a wind effect in dealing with the ballistic correction of the angles of gun elevation and training.

In dealing with wind we consider that immediately after the projectile is fired it becomes a part of the moving system of air plus target, and that the relative initial velocity of shell and air fixes the trajectory relatively to the moving air. The motion of the target relatively to the air is known in magnitude and direction from the addition of the "relative wind" vector and the "enemy apparent course-speed" vector as hereinafter described, and the predictor gives the initial direction of the trajectory relatively to the moving air. This method of dealing with wind falls in with the basic assumptions underlying the standard formulæ for calculating wind deflections in gunnery and is perfectly logical. The secondary deflections ignored by these assumptions are included in the phenomena of "drift" and "jump".

If $w_1$ and $w_2$ be the components of the relative wind up and across the range respectively due to the combination of true wind and ship's speed, and if V be the initial velocity of the shell and $\phi$ the quadrant elevation, our wind deflections to be applied to the gun are:—

$$\Delta \phi = -w_1 \sin \phi / V \quad (5)$$

$$\Delta Z = w_2 / V \cos \phi \quad (6)$$

Figure 15:
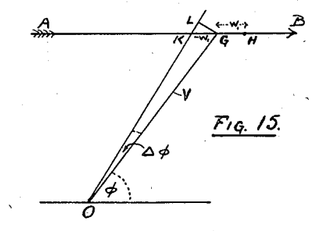
Fig. 15 is a diagram which illustrates the derivation of Equations (5) and (6).

Reference is now made to Fig. 15 which illustrates the derivation of Equations (5) and (6). O is the position of the gun on the ground, OG the direction of the gun axis when fired at a quadrant elevation $\phi$. Assume a wind velocity $w_1$ blowing in the direction AB. Immediately after leaving the gun the projectile is subjected to very high air resistance and on account of its rapid spin it precesses like a gyroscope until the resistance is approximately symmetrical with respect to the axis of the projectile. It never quite reaches this symmetrical state because the trajectory itself is bending, but it gets very near it and the lag gives rise to the phenomenon of drift. In consequence of this rapid precession towards the position of symmetrical resistance, which is with the axis of the shell coinciding with the direction of the relative velocity between shell and air, the trajectory must be calculated relatively to the moving air, and if the target is fixed, an allowance has then to be made for the movement of the air during the time of flight. In anti-aircraft gunnery, however, no such allowance for the movement of the air is required, because the target also partakes of the movement of the air, so that both target and shell are equally affected. If, therefore, in Fig. 15, OG represents the initial direction and velocity of the shell at the moment of leaving the gun and GH is the component wind velocity $w_1$ down the range, draw GK equal and opposite to GH, (i. e. $GK = -w_1$) then OK is the initial velocity of the shell relatively to the air both in magnitude and direction, and although the axis of the shell is in the direction OG at the muzzle of the gun it precesses very quickly round OK until it settles on OK, except for changes in the direction of OK itself.

Draw GL at right angles to OK to meet OK produced in L.

Then angle $KOG = \Delta\phi$ $$= \frac{LG}{OG}$$

$$= \frac{-w_1 \sin LKG}{OG}$$

$$= \frac{-w_1 \sin (\phi + \Delta\phi)}{V}$$

substantially $= -w_1 \sin \phi / V$     (5)

Similarly for a lateral component wind velocity $w_2$ across the range, the horizontal component velocity of the shell being $V \cos \phi$, the angular deflection upwind due to this component is $$\Delta Z = w_2 / V \cos \phi \quad (6)$$

In order to derive the target course and speed in relation to the air and to provide for the wind setting being obtained either from measurements of relative wind at the gun or from information obtained from meteorological stations we provide five dials. Each dial has a rotating crank of variable throw and the five dials deal respectively with the vectors—(a) own ship speed and course, (b) true wind, (c) relative wind, (d) target course and speed relatively to the air and (e) apparent target course and speed. We combine these vectors in pairs by simple pantagraphic linkage. Relative wind and apparent target course and speed give target air course and speed. The relative wind crank operates the wind deflections. The target air course and speed crank operates the (E. S. a.) and (E. S. t.) bars in the predictor.

Own ship's speed and course are known and relative wind may be measured locally, whence true wind is deduced by the mechanism.

If relative wind alone is adopted for the correction setting then three cranks suffice instead of five, but we may for convenience use a double wind crank for relative wind as hereinafter described in order to give the wind correction in relation to the vertical gun plane or future angle of gun bearing $B_2$, the pantagraphic linkage being operated from a crank turning in relation to the present angle of sight bearing $B_1$.

In order that the said invention may be clearly understood and more clearly carried into effect the same will be more fully described with reference to the accompanying drawings.

Fig. 4 is a sectional view of the mechanism of crank disc of Fig. 1a for operating the "enemy air speed" crank, the section being on the line E—F of Fig. 1a.

Figure 1A:
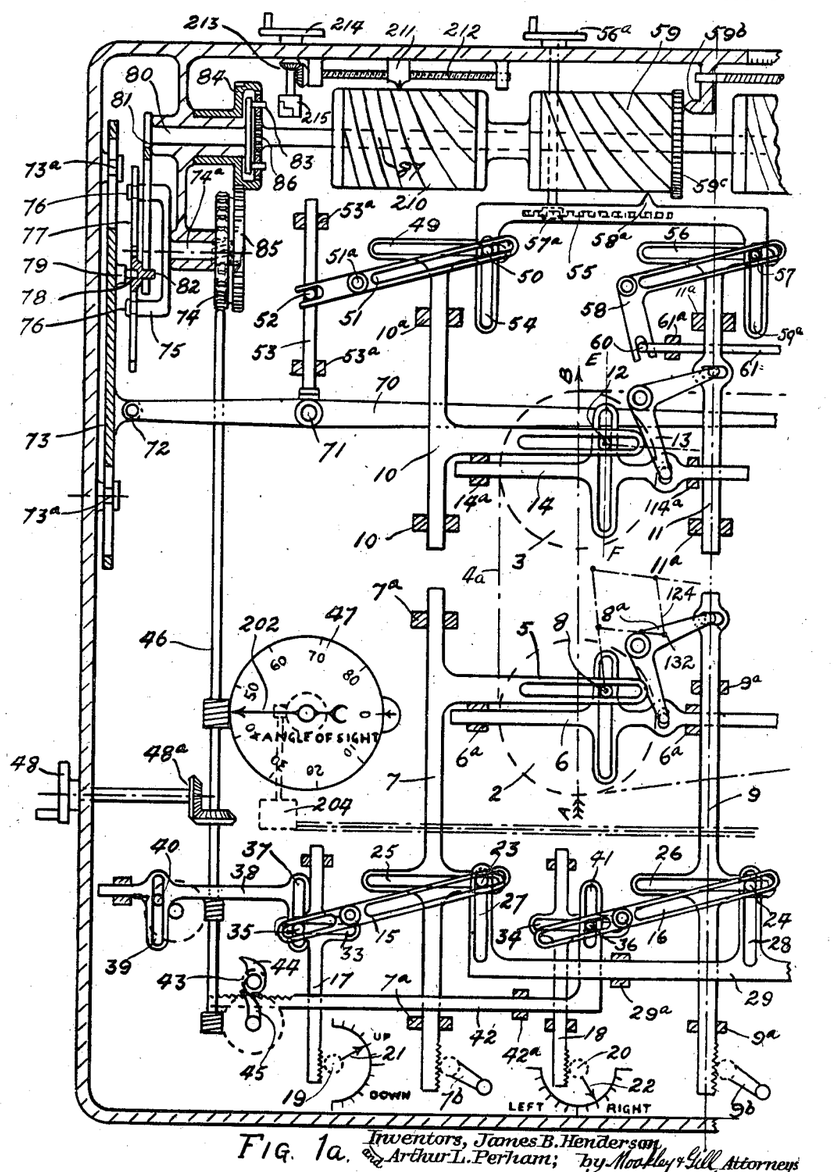
Figs. 1a and 1b show a general arrangement of apparatus embodying the invention and the general plan on which the various component mechanisms are interconnected. For clearness in illustration it has been necessary to divide the apparatus into two, Fig. 1a showing the left half approximately, and Fig. 1b the right half, with an overlap to show the sliders 9 and 11 in both parts.
Figure 1B:
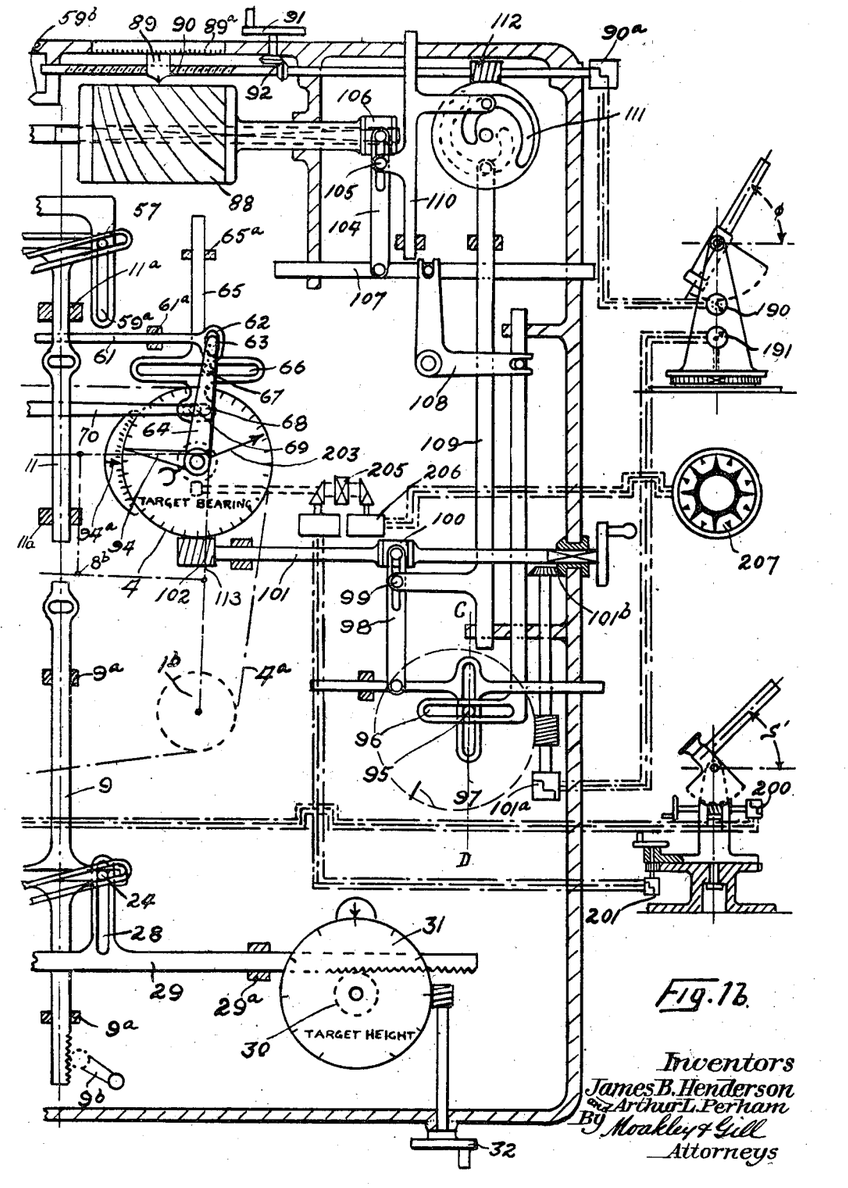
Figure 2:
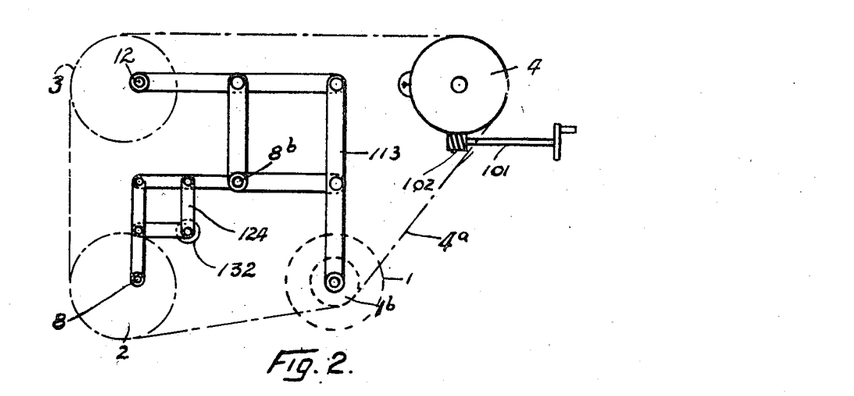
Fig. 2 illustrates a form of pantagraphic linkwork for coupling the various cranks together.

In Figs. 1a, 1b, 2 and 5 the "relative wind" crank, "enemy apparent speed" crank and "enemy air speed" crank are marked 1b, 2 and 3 respectively. In Fig. 2 the three cranks are shown in a natural disposition to suit the linkwork that couples them, but in Fig. 1a and 1b their positions have been slightly altered to illustrate more clearly how each crank acts upon its own particular part of the mechanism.

The three crank discs 1b, 2 and 3, are all connected by gearing to a training indicator dial 4 so that the three discs and dial always rotate in synchronism when the dial is set to any particular compass bearing corresponding to the angle of azimuth of the vertical sight plane. In Figs. 1a, 1b, 2 and 5 this gearing interconnection is diagrammatically indicated for simplicity by a chain 4a connecting the cranks 2, 3 and the dial 4, and the pulley 1b is shown of half the diameter of the others as it drives its crank through a 2:1 gear.

The predictor comprises primarily mechanism for solving Equations (3) and (4) which give the deflections introduced by the "enemy air speed", and this mechanism operated by the "enemy air speed" crank 3 will first be described. It will assist in comprehending the invention if it is assumed that the common centre line of crank discs 2 and 3 (Fig. 1a) is pointed at the target in the direction of the arrow A—B, the arrow being thus in the vertical sight plane. Let the radius from the centre of the crank disc 3 to the crank pin 12 be assumed to be disposed parallel to the course of an approaching aeroplane target and to represent on a certain scale the air speed of the target.

Two bars 10 and 14 are arranged to slide at right angles in guides 10a and 14a respectively and in each bar is formed a straight slot at right angles to the direction of sliding of the bar. The crankpin 12 engages these slots and the bars 10 and 14 accordingly receive displacements proportional to (E. S. t.) and (E. S. a.) respectively. The displacement of the bar 14 is conveyed by a bell-crank lever 13 to a sliding bar 11 arranged to slide in guides 11a parallel to bar 10. In the bar 10 is formed a straight slot 49 at right angles to the direction in which the bar slides, and a similar slot 56 is formed in bar 11. In the slot 49 a pin 50 is free to slide which engages in a radial slot in one arm of a double-armed lever 51 pivoted on the pin 51a. A radial slot in the other arm engages with a pin 52 on a slider 53 sliding in guides 53a. The pin 50 is also engaged by a slot 54 formed in and at right angles to a sliding bar 55 arranged to slide in guides (not shown) in a direction at right angles to the direction of sliding of bar 10.

The distance of the slot 54 from the fulcrum of lever 51 is adjusted proportionally to the "average horizontal velocity" of the shell, and accordingly the movement received by bar 53 is proportional to (E. S. t.)/(A. V. h.).

The positioning of the bar 55 is effected manually by turning a handle 56a geared by pinion 57a to a rack carried by the bar 55. A pointer 58a on the bar is arranged to traverse axially the surface of a drum 59 on which are marked curves labelled in terms of target height. The drum is given a rotation as hereinafter described proportional to the future angle of sight, and the height curves are so plotted as to give at any position of drum rotation an axially measured ordinate corresponding to the "average horizontal velocity" of the shell for the particular target height for which the curve is labelled.

In the bar 11 which receives a movement proportional to (E. S. a.) is formed a slot 56 at right angles to the direction of sliding of the bar. In this slot a pin 57 is free to slide and it also engages in a radial slot in one arm of a bell-crank lever 58. The pin 57 is also engaged by a slot 59a formed in the sliding bar 55 and arranged parallel to the slot 54. The distance of the slot 59a from the fulcrum of lever 58 is adjusted proportionally to the (A. V. h.) of the shell, this adjustment being simultaneous with and effected by the same means already described for adjusting the slot 54. The shorter arm of the bell-crank lever 58 has a radial slot engaging with a pin 60 on a slider 61 sliding in guides 61a. The movement imparted to this slider 61 is a resultant of the movement of bars 11 and 55 and is proportional to (E. S. a.) divided by (A. V. h.).

In the bar 61 is formed a short slot 62 (Fig. 1b) in which engages a pin 63 carried by an arm 64 which is pivoted about the axis of the training setting dial 4. Accordingly the arm 64 receives an angular swing from bar 61 and the sine of this angle is proportional to (E. S. a.) divided by (A. V. h). The combination of the sliders 11, 55 and 61 coupled by the lever 58 and acting as described upon the arm 64 provides a mechanical means of solving Equation (4), $$\sin Z = \frac{(E.\ S.\ a.)}{(A.\ V.\ h)}$$

and Z is indicated by the pointer 94 attached to the crank 64 on a scale marked in terms of Z engraved at either side of the pointer 94a.

A bar 65 is arranged free to slide in guides 65a in a direction radial to the disc 4 or along the arm 64 when in its central position, and in it is formed a slot 66 at right angles to its direction of sliding. A pin 67 is fixed to the arm 64 at a distance from the center of the disc 4 which represents unity. This pin engages in the slot 66, so that when the arm 64 is collinear with the slide 65, that is, when the angle Z is zero, the distance of the slot 66 from the centre of disc 4 is unity, or cos. 0°, but this distance will vary with any angular swing of the arm 64 being always proportional to the cosine of the angle of swing of the arm, or always proportional to cos. Z. By means of a slot 68 in the bar 65 this movement is imparted to a pin 69 at one end of a floating lever 70 which is pivoted by a pin 71 (Fig. 1a) to the slider 53 at an intermediate point in the length of the lever 70. The end of the lever remote from pin 69 carries a pin 72, which thus receives a composite movement due partly to the slider 53 (Fig. 1a) and partly to that of slider 65 (Fig. 1b). That is, the pin 72 receives a movement proportional to (E. S. t.)/(A. V. h.) plus cos Z, the whole combination of parts forming a means of solving mechanically the right hand side of Equation (3).

In combining the motions of the two sliders 65 and 53 by means of the lever 70, the scales of these sliders must be so related that the two component motions communicated to the slide 73, which carries the pin 72, are on the same scale. This necessitates that the scales of the two sliders 65 and 53 respectively must be proportional to their distances from the pin 72. Thus, for example, if the distance from pin 72 to pin 71 is one third of that from 71 to 69, then the scale of movement of slider 65 is three times as great as that of slider 73 and the scale of movement of slider 53 is three-fourths of that of slider 73. The scale of movement of slider 65 is then four times greater than that of slider 53. In other words the relative scale dimensions of the movements of sliders 73, 53 and 65 are respectively 1, 3/4 and 3. As explained hereinafter the distance separating the centres of the spindles 80 and 74a determine the scale dimension representing unity in constructing this portion of the mechanism.

The pin 72 is carried by the sliding bar 73 on guides 73a, this bar being a component of the essential cotangent ratio mechanism already referred to and now to be described.

Figures 7, 8, 9:
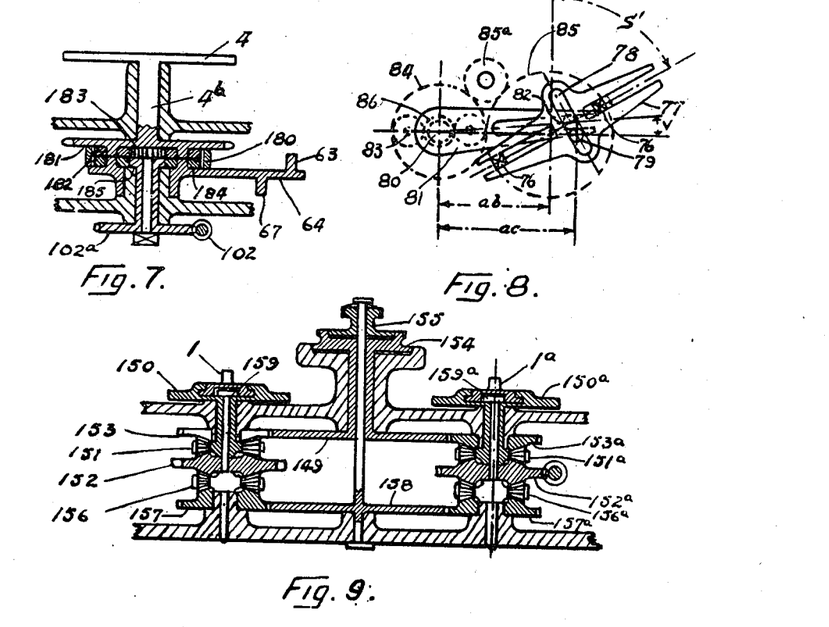
Fig. 7 shows a section of a modification of the angle of sight bearing dial to enable future angle of sight bearings, or gun bearing, to be readily transmitted to the gun.
Fig. 8 shows an end view of the cotangent ratio mechanism.
Fig. 9 shows a section of a form of mechanism used where a double relative wind crank is employed.

A spindle 46 that is geared to the dial 47 giving the angle of sight elevation as hereinafter described is also geared to a worm wheel 74 in such a ratio that the worm wheel turns through an angle equal to the angle of sight. The spindle 74a carrying the worm wheel 74 also carries a frame 75 provided with guides 76 engaging with slots in a plate or cross piece 77. An end view is shown in Fig. 8. At right angles to the slots in the cross piece is formed a groove 78 in which a pin 79 carried by the bar 73 engages. A pin 82 is positioned on the cross piece along the centre line of groove 78 and so that it moves diametrically across the axis of the spindle 74a. Parallel to this spindle is another spindle 80 carrying a radially slotted arm 81. The pin 82 engages with this radial slot and the bar 73 is arranged to slide so that the pin 79 slides to and fro in the plane containing the axes of spindles 80 and 74a, the pin being always parallel with these axes. Unless the pin 79 is in a position coaxial with the spindle 74a, any rotation of the wormwheel 74 will impart a swing to the arm 81, as the pin 82 will describe part of an arc of a circle the centre of which lies midway between pin 79 and the axis of spindle 74a, the diameter of this circle being equal to the distance between pin 79 and the axis of spindle 74a. The action of the cross piece 77 is kinematically equivalent to that of the centre disc of an Oldham coupling connecting shafts on the centres of the spindles 74a and pin 79.

As shown in Figs. 1a and 8 the spindle 80 carries the pivots 83 of the planet pinions of an epicyclic gear, of which 86 is the sun pinion. Concentric with the spindle 80 is mounted an internally toothed annulus 84 engaging internally with the planet pinions and also provided with external teeth arranged to gear through an intermediate pinion 85a with a toothed wheel 85 fixed to wormwheel 74. The gear ratio between 84 and 85 is chosen so that the magnification of the motion of 85 transmitted to 86 when 80 is steady is equal to the magnification of the motion of 81 transmitted to 86 when 84 is steady.

The sun pinion 86 of the epicyclic gear by this construction receives a rotation which is the aggregate of the rotations of the arm 81 and the annulus 84, and the mechanism has the property that the ratio of the contangent of the angle of sight (represented by the movement of wormwheel 74) and the cotangent of the "angle of sight plus the swing of arm 81" is proportional to the distance of pin 79 from the axis of spindle 80, the distance being measured to a scale on which the separation of the spindles 74a and 80 is unity.

Figure 16:
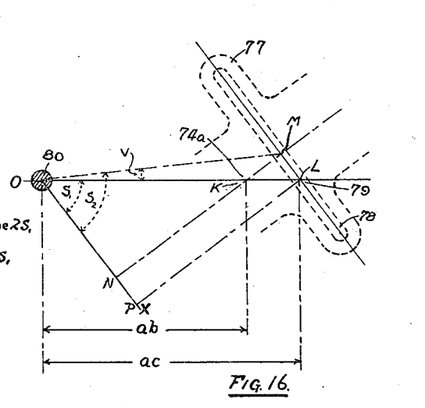
Fig. 16 is a geometrical diagram of the mechanism of Fig. 8.

If the slide bar 77 be inclined to the vertical at an angle $S_1$ as shown in Fig. 8, the arm 81 is inclined at an angle V to the horizontal such that $\cot S_1/\cot(S_1+V)$ is equal to $ac/ab$. Hence since $ab$ is constant we make $ac$ equal to (E. S. t.)/(A. V. h.) plus cos Z on the scale on which $ab$ is unity and then V is $(S_2-S_1)$. This mechanism gives us the difference $(S_2-S_1)$ and has the great advantage that it does not lock in any position as other cotangent mechanisms do. In order to get $S_2$ we add $S_1$ and V by the epicyclic gear described or by other suitable gear. Fig. 16 is a geometrical diagram of the mechanism of Fig. 8 in which a line OX has been drawn from the axis O of spindle 80 parallel to the groove 78 of the cross-piece 77. Perpendiculars LP and KN are dropped on to OX from L, the axis of pin 79, and K, the axis of spindle 74a. From these it will be seen that $$\cot S_1/\cot S_2 = MN/NK$$
$$= OL/OK$$
$$= ac/ab.$$

The mechanism in conjunction with that controlling the lever 70 forms a mechanical means of solving Equation (3) to give $S_2$. The sun pinion 86 turns through a multiple (conveniently arranged to be 4 by using appropriate sizes for the gear wheels 84 and 85 and the epicyclic gear wheel sizes) of the future angle of sight $S_2$; and pinion 86 is mounted on a long spindle 87 carrying drums 59 (Fig. 1a) and 88 (Fig. 1b) called respectively the average velocity drum and the quadrant elevation drum. The fixed pointer 59b indicates on the scale 59c engraved on the drum 59 the value of $S_2$, the future angle of sight, if required for reference.

A pointer 89 traversed by a screw 90 (Fig. 1b) operated by a handle 91 through bevel gearing 92 moves in a direction axial to the drum 88 and along its surface which is marked in curves labelled in terms of target height, and the curves are so plotted as to give, at any future angle of sight drum position, axially measured co-ordinates corresponding to the quadrant elevation of the gun for the particular target height for which the curve is labelled. A telegraphic transmitter 90a is coupled to the screw 90 so that the quadrant elevation may be conveyed to the guns or their sighting apparatus.

The arm 64 pivoted about the axis of the training dial 4 (Fig. 1b) also carries a pointer 94 which, as well as the fixed index 94a, is read against the scale of dial 4. By the fixed index 94a the dial is set to the present compass angle of bearing of the target and by the pointer 94 the future or predicted compass angle is indicated. And by a scale to either side of index 94a the deflection Z may be read off by pointer 94, as already described.

We shall now describe the mechanism for solving the Equations (1) and (2) which give the connection between the angular velocities $e$ and $b$ and the enemy speeds (E. S. a.) and (E. S. t.). This mechanism is operated from dial 2 which denotes the enemy apparent course and speed.

Two bars 7 and 6 (Fig. 1a) are arranged to slide at right angles in guides 7a and 6a respectively and in each bar is formed a straight slot at right angles to the direction of sliding of the bar. The crank pin 8 engages these slots and the bars 7 and 6 accordingly receive displacements proportional to the apparent (E. S. t.) and (E. S. a.) respectively. The displacement of the bar 6 is conveyed by a bell crank lever 8a to a sliding bar 9 arranged to slide parallel to bar 7 in guides 9a. Handles 7b and 9b are connected by rack and pinion gearing to the bars 7 and 9. These handles are normally free and move with the bars 7 and 9 but when it is desired to set the angular velocities by means of the handles 7a and 9a the crank pin 8 is released in a manner which will be described later.

The bars 7 and 9 are coupled by the rocking levers 15 and 16 to sliders 17 and 18 carrying racks gearing with pinions 19 and 20. The spindles carrying these pinions also carry indicating pointers 21 and 22 reading against scales spaced and figured in accordance with the vertical and lateral rates $e$ and $b$ respectively.

The levers 15 and 16 are slotted radially to engage pins 23 and 24 and these pins also engage in slots 25 and 26 formed in and at right angles to the bars 7 and 9. The pins 23 and 24 also engage in slots 27 and 28 formed in and at right angles to a bar 29 free to slide in guides 29a in a direction at right angles to the direction of sliding of bars 7 and 9. A rack cut on the bar 29 engages a pinion 30 (Fig. 1b) on a spindle carrying a dial 31. The dial is divided and marked in terms of target height and a handwheel 32 geared to the dial 31 enables the slots 27 and 28 of the bar 29 to be set a distance from the fulcrums of the levers 15 and 16 to correspond to the target height.

In the bars 17 and 18 are formed slots 33 and 34 (Fig. 1a) at right angles to the direction of sliding of the bars, and pins 35 and 36 engaging these slots also engage the radial slots of levers 15 and 16.

Figure 17:
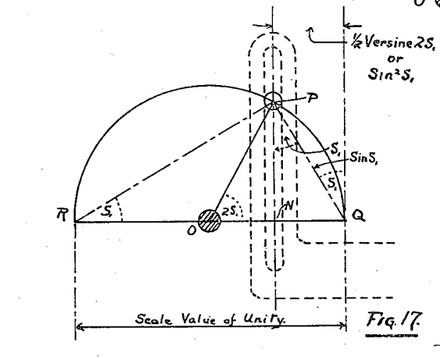
Fig. 17 is a trigonometrical diagram illustrative of part of the mechanism.

The pin 35 also engages in a slot 37 formed in and at right angles to a bar 38 free to slide in a direction at right angles to the direction of sliding of bar 17. Another slot 39 parallel to the slot 37 is formed in the bar 38 and this slot engages with a crank-pin 40 carried by a disc arranged to be rotated (as hereinafter described) through twice the angle of sight of the target as will be readily apparent from the trigonometrical diagram of Fig. 17. With reference to Fig. 17, QR represents unity, so that OR, OP and OQ each represent ½.

Then ½ versine $2S_1 =$ ½$(1-\cos 2S_1)$
$=$ ½ $-$ ½ $\cos 2S_1$
$= OQ - OP \cdot ON/OP$
$= NQ$
$= PQ \cdot \sin S_1$
$= QR \cdot \sin^2 S_1$
$= \sin^2 S_1$ As half the versine of twice an angle equals the square of the sine of that angle the crank-pin and slot mechanism forms a convenient means for deriving $\sin^2 S_1$ but a cam or other mechanism may be used if preferred.. The combination of the four bars 7, 17, 29 and 38, coupled by the lever 15 forms a mechanical means of solving the Equation (1) as the movement (E. S. t.) is to the movement of H as that of $e$ is to that of $\sin^2 S_1$.

The pin 36 that engages in the slots of lever 16 and slider 18 also engages in a slot 41 formed in and at right angles to a bar 42 guided in guides 42$a$ in a direction at right angles to the direction in which the bar 18 slides. On the bar 42 is formed a rack gearing with a pinion 43 the spindle of which is turned proportionally to the tangent of the angle of sight by being connected by cam gearing 44 and 45 to a spindle turning proportionally to the angle of sight. The four sliders 9, 18, 29 and 42, coupled by the lever 16 provide a mechanical means for solving Equation (2) as the movement (E. S. a.) is to the movement of H as that of $b$ is to that of $\tan S_1$.

The cam gearings 44 and 45 and the crank pin 40 are geared to a spindle 46 which is geared to a dial 47 engraved and spaced in terms of the angle of sight. A handle 48 coupled by bevel gearing 48$a$ to spindle 46 enables the dial 47 to be set to the angle of sight $S_1$, and simultaneously the sliders 38 and 42 automatically receive movements proportional to $\sin^2 S_1$ and $\tan S_1$ respectively.

The effects of wind and of own ship's course and speed are of two kinds. Firstly they affect the apparent speed and course of the enemy and alter the values of the angular velocities $e$ and $b$ and the values of the apparent (E. S. t.) and (E. S. a.) which are deduced from them. The values of (E. S. t.) and (E. S. a.) to be used in prediction are not the apparent values but the values relatively to the air deduced from the enemy air speed, and therefore in the mechanism the apparent values are deduced from crank 2 set to the apparent speed and the prediction values from the crank 3 set to the air speed. The manner in which the apparent values can be used to check the air values has still to be described.

Secondly the relative wind deflects the trajectory after the shot leaves the muzzle of the gun, and if $w_1$ and $w_2$ be the components of the relative wind up the range and across it and if $V$ be the muzzle velocity the changes in the quadrant elevation and azimuthal deflection required to compensate the effects of relative wind are $$\Delta\phi = -w_1 \sin\phi/V \text{ and } \Delta Z = w_2/V \cos\phi.$$

These corrections are applied in our mechanism by moving the drum 88 (Fig. 1$b$) axially by an amount $\Delta\phi$ relatively to the pointer 89 and by moving the shaft 101 axially thereby turning the dial 4 by an amount $\Delta Z$ which is transmitted to the guns when the dial is reset. These mechanisms will now be described.

From the crank pin 95 of the relative wind crank 1 movement is imparted to two slotted crossheads 96 and 97 arranged to slide at right angles. A lever 98 pivoted on a fulcrum pin 99 conveys a reduced movement from crosshead 97 to a collar 100 on the spindle 101 carrying the worm 102 that imports motion to the training dial 4 and the crank discs 1$b$, 2 and 3. The endwise travel thus applied to the worm entails in order to reset the dial a corresponding greater or less rotation of the worm spindle 101 and the gun bearing transmitter 101$a$ geared to it.

Thus if the lead of the worm screw 102 be, for example, one-tenth of an inch and if the worm is traversed axially three-tenths of an inch by the collar 100, three turns more or less will be required to restore the dial 4 to the same position as it occupied before the collar 100 was traversed under the control of the wind correction crank pin 95.

In a similar manner a lever 104 pivoted on a fulcrum pin 105 conveys a reduced movement from crosshead 96 to a collar 106 on the hub of the quadrant elevation drum 88. The lever 104 is coupled through a sliding bar 107 and bell-crank lever 108 to the crosshead 96. The endwise travel thus given to drum 88 entails a greater or less rotation of the screw 90 and the quadrant elevation transmitter 90$a$ coupled to it in order to reset the pointer 89. Thus if the lead of the screw 90 is one-tenth of an inch, and if the screw is traversed axially three-tenths of an inch by the collar 106, three turns more or less will be required to restore the pointer 89 to the same height curve as it was set to before the collar 106 was traversed by the wind correction crank pin 95. A scale 89$a$ may be marked on the predictor framework to indicate by pointer 89 the quadrant elevation corrected for wind.

The fulcrum pins 99 and 105 are adjustable to vary the velocity ratio of the leverage. The pins are carried by sliding bars 109 and 110 fitted with rollers engaging in cam slots cut in a worm wheel 111 rotated by a worm 112 mounted on the spindle of screw 90. Fig. 1$b$ merely shows the cam grooves as of spiral form but is not intended to portray their actual curvature as this is simply a matter of design in relation to other parts. In the particular assemblage shown the two cams must be of opposite hand, while their different function demands different forms. To prevent the two cam grooves from intersecting each other it is preferably to have one of them cut on the face of the disc and the other on its reverse side. The wormwheel 111 accordingly rotates proportionally to the quadrant elevation $\phi$ and the cams are shaped so that the fulcrums of the variable ratio levers 104 and 98 receive a setting proportional to $\sin\phi/V$ and $1/V\cos\phi$ respectively. Thus the components of wind velocity up and across the range represented by the movements of crossheads 96 and 95 are reduced by these ratios and the corrections applied to the predicted azimuth angle and quadrant elevation are in accordance with formulæ (5) and (6), but it will be understood that if convenient other mechanism than that described may be used to effect the same purpose.

The manner in which the prediction problem is presented varies considerably. When an enemy aeroplane is first sighted it may be possible to judge its air course and speed in which case the air course and speed can be set. In some cases it may be possible to estimate the relative course with considerable accuracy but as soon as an angular velocity meter is brought to bear on the target and the values of $e$ and $b$ so obtained are set by handles 7$b$ and 9$b$, the relative speed and course are automatically determined and indicated on crank disc 2. The relative wind can always be measured or estimated and set upon crank disc 1. In order that all the observations may serve to check each other we provide a linkage between the three cranks of air speed, relative apparent speed, and relative wind so that the air speed is continuously maintained as the resultant of the other two. This linkage we conveniently provide by means of pantagraphs.

In Fig. 2 the pantagraphic linkage 113 is shown coupling the crank pins of the "relative wind" crank disc 1b, the "enemy apparent speed" crank disc 2, and the "enemy air speed" crank disc 3 so that the resultant of the sum of the two vectors 1b and 3 is given by the pin 8b on half scale. The motion of 8b is transferred to pin 8 of vector 2 by the pantagraph 124, the fulcrum of which, 132, is fixed.

Figure 3:
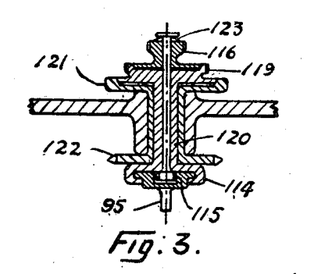
Fig. 3 is a sectional view of the crank disc mechanism for operating the adjustable "relative wind" crank pin of Fig. 1b, the section being along the line C—D of Fig. 1b.

The constructions of the three crank discs differ in order to meet their separate requirements. The "relative wind" crank shown in section in Fig. 3 is arranged so that the crank pin 95 can be adjusted in radius by means of a slide diametrically disposed across the crank disc 114. A rack cut on the slide engages a pinion 115 connected by a spindle to a knob 116 carrying a disc spaced at the circumference with divisions marked in terms of wind velocity. The disc is bevelled to form a conical frictional surface in the knob 119 which is connected by a hollow sleeve 120 to the crank disc 114. The knob 119 also has a conical friction surface engaging with a corresponding surface on a disc 121 connected by a hollow spindle to a chain or gear wheel 122 by which the disc 121 is geared to the training dial 4. A spring 123 serves to keep the two friction cones in contact so that when either knob 116 or 119 is adjusted the setting is retained by the friction cones. A scale on the knob 119 indicates the compass setting of the direction of the relative wind.

For the "enemy apparent speed" crank 2 a similar adjustable type of crank to that of Fig. 3 is employed except that the friction applying conical surfaces and spring are not required. Thus any setting of course and speed made by the knobs cannot be fixed by the crank mechanism. The crank-pin is coupled by a pantagraphic linkage 124 to the centre pin 8b of the linkage 113.

Figure 4:
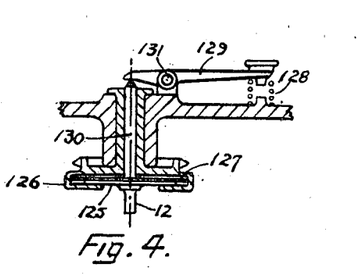

For the "enemy air speed" crank 3 we preferably employ a type of crank different from that of Fig. 3. As shown in Fig. 4 we mount the crank pin 12 on a disc 125 free to float in any direction on the face of the crank disc 126. A clamping plate 127 is arranged so that pressure can be applied to it so as to grip the crank-pin disc firmly between the clamping plate 127 and the inner face or rim of the crank disc 126. A spring 128 acting upon a lever 129 pivoted on a pin 131 may conveniently serve to apply pressure to the clamping plate 127 by a rod 130 passing through the hollow spindle of the crank disc 126. The arrangement causes the crank pin 12 always to be tightly clamped upon its crank disc unless the lever 129 is depressed by hand. The frictional grip of the clamping device may be increased by using leather or fabric facings on the frictional surfaces or by other means.

Our predictor mechanism may be set optionally to either the observed angular rates of the target or to its apparent course and speed, and in either case the lever 129 is kept depressed whilst the settings are made, and is then released. When setting the rates the handles 7b and 9b are operated and when setting to apparent course and speed the knobs 116 and 119 are operated.

It is a special feature of our invention that by the manner in which the course and speed settings are intercoupled to the rate pointers a setting of the latter automatically and simultaneously indicates the enemy course and speed underlying the observed rates provided H and S₁ are correctly set on the predictor. And conversely a course-speed setting automatically causes the appropriate rates to be indicated. So long as the target does not alter height, course or speed our predictor automatically generates the predicted angles of quadrant elevation and gun bearing as the target is followed in elevation and bearing by the controlling sight, and the rate pointers automatically turn to keep in agreement with the necessarily changing rates.

Figure 6:
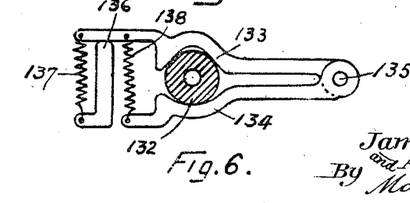
Fig. 6 shows a form of elastic positioning device for the fulcrums of the pantagraphic linkages.

The fulcrum pin 132 of the pantagraph 124 is not absolutely rigid but it is normally held in a definite position by an elastic constraining device shown in Fig. 6, consisting of two claw levers 133 and 134 pivoted on a pin 135. The claw of one lever is V-shaped and the other shaped to a hollow curve. The boss of the fulcrum pin 132 is firmly held between the claws and in the V-groove of lever 133 by a spring 138 and lever 133 in turn is firmly held against a fixed stop 136 by a spring 137. The fulcrum pin 132 is by these means held in a definite position, but if sufficient force is applied to the pin it may be displaced in any direction in the plane of the levers, returning to its original position when the force no longer acts. The device is solely to prevent the locking of the linkwork which might occur when the centre pin 8b is at or near its central position of zero enemy speed, a position to which the crank pin of the mechanism of Fig. 3 cannot always accommodate itself. But for the possibility of this dead-centre effect, the crank 2 could be placed so as to engage directly with the hinge 8b of the pantagraph 113 and the secondary pantagraph and its elastic fulcrum would not be required.

Figure 5:
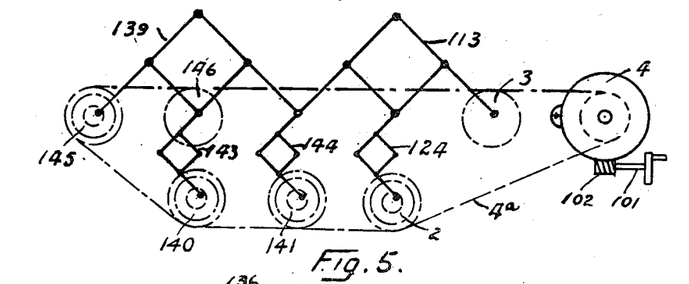
Fig. 5 shows a more elaborate pantagraphic linkage to include cranks for "true wind" and "own ship" speed settings.

In some cases we may fit additional dials and pantagraphs as in Fig. 5 where a second pantagraph 139 has been added to the arrangement shown in Fig. 2 to enable the "relative wind" setting to be obtained by the vectorial addition of the speed of "own ship" and "true wind" speed. The "own ship" crank 145 is of the type of Fig. 3; the "true wind" crank 146 and the "enemy air speed" crank 3 are of the type of Fig. 4. The three indicating and setting cranks 140, 141 and 2 for true wind, relative wind and enemy apparent speed are all of the type of Fig. 3 but without the friction cones in their adjusting knobs, and they are coupled by the three secondary pantagraphs 143, 144 and 124 to the main pantagraphs 139 and 113. Elastic fulcrums of the type of Fig. 6 or devices serving an equivalent purpose are used with the secondary pantagraphs. The crank discs 145, 146, 140, 141, 2 and 3 are all coupled together so as to turn in synchronism with the training dial 4.

As the "vertical sight plane" and the "vertical gun plane" are angularly separated in azimuth by the amount of the deflection Z, we prefer for more strictly accurate wind correction to employ two separate cranks 1 and 1a, Fig. 9, to operate respectively the wind correction mechanism and the pantagraph 113. In this case we gear the wind correction crank so as to turn through an angle equal to the compass angle of gun training; whereas we gear the pantagraph crank so as to turn equally with the compass angle of training of the sight. The separate cranks may for convenience in operating be coupled together so that one adjustment of relative wind speed and direction simultaneously adjusts the crankpins of both cranks. Fig. 9 shows how this may be effected. In this case we do not adjust the wind crank disc in direct relation to the wheel 150 that drives it and which couples it to the training dial 4. Instead, we arrange to drive the wind crank discs 150 and 150a through differential gears 151 and 151a from wheels 152 and 152a and we gear the abutment wheels 153 and 153a to a wheel 149 carried by the hollow spindle of the relative wind direction dial 154. Thus by setting this dial to the apparent compass direction of the wind we simultaneously adjust the abutment wheels 153 and 153a and so alter the phase of the crank discs 150 and 150a in relation to the driving wheels 152 and 152a.

The wind velocity setting knob 155 turns with dial 154 but it can be adjusted relatively to it, when desired, to set wind velocity. Differential gearing 156 and 156a similar to that just described, with abutment wheels 157 and 157a geared to a wheel 158 carried on the spindle of the dial 155, enable the pinions 159 and 159a controlling the radius of the cranks 1 and 1a to be adjusted relatively to the crank discs 150 and 150a. Thus on setting wind velocity a relative movement of dial 155 to dial 154 causes a corresponding alteration of radius of both crank pins 1 and 1a. The wheel 152 is geared so as to turn through the compass angle of bearing of the vertical sight plane, and the wheel 152a is geared so as to turn through the compass angle of bearing of the gun.

Figure 10:
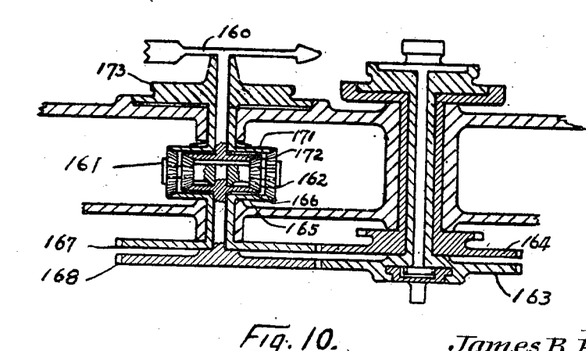
Fig. 10 shows a section of a form of mechanism for coupling an enemy course index bar to the enemy apparent course and speed crank.

For convenience in setting the compass angle of course we may provide an arrow shaped bar coupled to the apparent enemy course dial in such a manner that by turning the arrow, as well as the eye can estimate, into agreement with the observed course of the enemy the enemy apparent course dial is simultaneously adjusted. Fig. 10 shows how this may be effected.

A double differential gear, comprising one differential 161 surrounding another one 162, is used to connect the arrow 160 to the crank disc 163 and the wheel 164 by which the disc is driven. The planet pinion carrying arm of the differential gears is common to both gears and is under no constraint other than that entailed by its planet pinions being geared to the bevel wheels of the two differential gears. The lower bevel wheels 165 and 166 are coupled by gear wheels 167 and 168 to wheel 164 and crank disc 163 respectively. Wheels 167 and 164 are equal in size, as also are wheels 168 and 163. The upper bevel wheels 171 and 172 are carried by a dial 173 and the enemy course arrow respectively. Any relative adjustment of arrow 160 and dial 173 causes a similar equal relative adjustment of the crank disc 163 on its driving wheel 164. The dial 173 is engraved to indicate the compass course of the ship and when using the arrow 160 the dial 173 must first be set to the ship's course. Instead of being set by hand it may be geared to a repeater motor controlled by the gyro-compass of the ship. Unless the dial 173 were employed a change of the ship's course would turn the arrow out of agreement with the enemy course.

Where our predictor is required to transmit the future angle of bearing of the target to the guns we may adopt special means for driving the target bearing dial 4 as shown in Fig. 7.

Instead of the worm 102 being directly geared to the dial 4 we interpose a form of differential gear between the wormwheel 102a and the dial 4. This differential gear is conveniently arranged so that its abutment member is connected to the deflection arm 64 in such a manner that any swing of the arm is conveyed equiangularly to the dial 4. Thus when dial 4 is set to any present angle of target bearing $B_1$, the rotation of the wormwheel 102a is proportional to the angle $B_1$ plus or minus the angle of swing Z of the arm 64. As the worm 102 is geared by bevel gearing 101b (Fig. 1b) to the gun bearing transmitter 101a, the latter transmits future target bearing $B_2$ to the guns.

A differential gear coupling the wormwheel 102a to dial 4 may conveniently be arranged as in Fig. 7. A double sun and planet epicyclic gearing is employed, consisting of two similar gears which are separate except that the annulus or internally toothed wheel 180 is common to both gears. The dial 4 is carried by a spindle 4b solid with the chain wheel 181 which couples it to the wind and enemy speed cranks. The chain wheel 181 forms the epicyclic arm carrying the planet pinions 182 gearing with a sun pinion 183. Similarly the deflection arm 64 forms the epicyclic arm carrying the planet pinions 184 gearing with a sun pinion 185. When the wormwheel 102a is rotated it causes a relative displacement of the sun pinion 185 to the sun pinion 183, and as the freely floating annulus 180 is common to both sun and planet gears, there results a corresponding relative displacement of the planet-pinion-carrying wheel 181 to the planet-pinion-carrying arm 64. Dial 4 thus receives a rotation directly equal to the swing of the arm 64 plus a reduced rotation from sun pinion 185 driven by wormwheel 102a. The sun pinion 183 is ordinarily fixed or anchored to the frame of the predictor, but it may be utilized as a means of introducing "drift" corrections by arranging for it to be swung under the control of any suitable form of drift correction mechanism.

In Fig. 1b the transmitters 90a and 101a are shown electrically connected to elevation and training receivers 190 and 191 of a distant gun mounting. Figs. 1a and 1b also show how the transmitters 200 and 201 for elevation and training of the director sight are electrically connected to pointers 202 (Fig. 1a) and 203 (Fig. 1b) mounted concentrically about the axes of the angle of sight dial 47 and training dial 4. The angle of sight pointer 202 is driven by gearing from the receiver 204 and in use the zero mark of dial 47 is kept in line with the arrow of pointer 202.

For ship use the training pointer 203 (Fig. 1b) is not solely controlled from the director sight but is driven by a differential gear 205 connected to a gyro-compass repeater motor electrically coupled in the usual manner to the gyro-compass 207. Pointer 203 thus receives an angular movement corresponding to the difference of compass bearing and the angle of sight training of the director sight in relation to the ship, with the result and object that dial 4 receives a setting of target bearing in relation to the compass, in other words it receives the target compass bearing even though the ship alters course.

In order to explain as clearly as possible the means of carrying our invention into effect a somewhat specific application has been described, but it will be readily understood that the invention is by no means limited to the specific application described, and that many variations in arrangement and in the use of mechanical equivalents for the mechanisms detailed may be adopted in constructing apparatus to embody our invention.

Owing to the method we adopt of treating the motion of the ship as a wind effect included in the "relative wind" measurement, the simple three crank arrangement that suffices for anti-aircraft guns on land is equally well adapted to serve on board ship. On land the relative wind is the same as the true wind, since the gun is stationary.

If it is desired to derive a fuze number setting by the predictor we may provide a drum 210 (Fig. 1a) rotated by the future angle of sight spindle 87, and we mark the drum surface with curves labelled in terms of target height. A pointer 211 may be arranged to traverse axially the surface of the drum under the control of a screw 212 coupled by bevel gearing 213 to a handle 214. The curves are plotted so that the movement of pointer 211 when set to any height curve is proportional to the fuze setting number appropriate to that height at the future angle of sight position of rotation of the drum. A transmitter 215 may be coupled to the handle 214 so that the fuze number setting may be electrically conveyed to a receiver at the gun. Means may be included to give the drum 210 a rotation in advance of the spindle 87 in order to compensate for the time lost in the interval of setting the fuze and the shell leaving the gun, and the time interval adjustment may be variable as is usual in anti-aircraft gunnery practice.

We claim:—

1. In a fire-control system for anti-aircraft guns, predicting mechanism comprising a plurality of operatively connected rotary members, calculating means operable thereby including a quadrant elevation indicator and a relative wind vector mechanism, means to operate said vector mechanism and one of said rotary members according to the angle of azimuth of a vertical sight plane, means operable by said vector mechanism to operate said operated rotary member and said quadrant elevation indicator by amounts necessary to establish the air as the datum of reference and the relative velocity of the air and a projectile as the initial velocity of the projectile both in amount and direction.

2. In a fire control system for anti-aircraft guns, predicting mechanism comprising a plurality of operatively connected vector mechanisms having rotatable members, means to synchronously rotate said rotatable members according to the azimuth of a vertical sight plane through a target, and pantagraph linkage coupled to and operable with said vector mechanisms establishing a check between certain vectors.

3. In a fire control system for anti-aircraft guns, predicting mechanism comprising a vector mechanism settable according to the course and speed of a target, operating means therefor, different elements operable in connection therewith proportionately to the angular velocities in different planes of a line of sight to a target, operating connections therebetween, and other means for initially setting said elements.

4. In a fire control system for anti-aircraft guns, predicting mechanism comprising an adjustable crank element, means to set the same in accordance with the course and speed of a target, members adapted to indicate the change of the target's position in elevation and azimuth during the time of flight of a projectile fired thereat, and operating mechanism intermediate said crank element and indicating members to actuate the latter, said intermediate mechanism having parts operable according to the target's speed in a vertical sight plane divided by the average component velocity of the projectile in a horizontal plane plus the cosine of the azimuthal deflection of a line of sight to the target during the projectile's time of flight, and other parts operable according to the target's speed perpendicular to the vertical sight plane divided by the average component velocity of the projectile in a horizontal plane.

5. In a fire control system for anti-aircraft guns predictor mechanism comprising a member movable in proportion to an angle of gun bearing, a vector element settable in accordance with the direction and velocity of the wind relatively to a gun, a second element actuated by said vector element in proportion to the component of said relative wind at right angles to the vertical plane of the gun axis, means having a variable part for conveying motion from said second element to said gun bearing member, means operable in accordance with the quadrant elevation of the gun and other coacting means adapted to actuate said variable part in proportion to the reciprocal of the product of the cosine of said quadrant elevation multiplied by the muzzle velocity of a shell fired from the gun so as to vary the motion conveyed from said second element to said gun bearing member in accordance with said reciprocal.

6. In a fire control system for anti-aircraft guns, predicting mechanism comprising a member and means to adjust the same in proportion to an angle of gun bearing, and means for correcting the settings of said member to compensate the effect of wind on the trajectory of the shell, said last means comprising a member adjustable in proportion to the direction and velocity of the wind relatively to the gun, other means adjustable in proportion to a function of the muzzle velocity of the shell and the quadrant elevation of the gun, and differential means actuated partly by said last member and partly by said last means for adjusting the setting of said first member.

7. In a fire control system for anti-aircraft guns, predicting mechanism comprising predictor elements, a crank for operating the same set in accordance with the target's course and speed in relation to the air, rate indicating means for indicating the angular velocity of a line of sight to the target, and an operating crank therefor set in accordance with the apparent course and speed of the target in relation to a gun mounting.

8. The combination with a ship's gyrocompass and a sighting device mounted on a ship and adapted to be trained, of a predicting mechanism having co-acting elements including a rotary vector element adapted to be set in accordance with the speed and course of the ship, a second rotary vector element adapted to be set in accordance with the direction and velocity of the wind, a third rotary vector element representing the direction and the velocity of the wind relatively to the ship, a mechanical linkage interconnecting said three elements so that the setting of any one of them represents in radius and phase the resultant of the settings of the other two, differential gearing operatively responsive to said compass and sighting device and operatively connected to said three rotary elements to rotate the same through an angle corresponding to the difference between the compass bearing of the ship's course and the training of said sighting device relatively to the ship.

9. In a fire control system for anti-aircraft guns, predicting mechanism comprising a pair of shafts, a coupling for said shafts comprising co-acting members in trigonometric relationship correlating said shafts for definite relative adjustment proportionately to the cotangents of their angles of rotation.

10. In a fire control system for anti-aircraft guns, predicting mechanism comprising a device for deriving the value of the square of the sine of the present angle of elevation of a line of sight comprising a slidable slotted crosshead, a crank pin co-acting therewith and a means to actuate said crank pin to turn the same through twice the present angle of elevation of the line of sight.

11. In a fire control system for anti-aircraft guns, predicting mechanism comprising an adjustable crank pin settable according to the course and speed of a target, slidable elements responsive thereto proportionately to the target's speed in a vertical sight plane and perpendicular thereto, a device settable in accordance with the height of the target pivotally connected with said elements, members respectively adapted to be operated according to the component angular velocities of a line of sight to the target in a vertical plane and in azimuth, variable leverage devices operable by the pivotal connections between said device and elements to operate said members, and separate means operable according to different trigonometric functions of the present angular elevation of a line of sight respectively pivotally connected with different ones of said elements.

12. In a fire control system for anti-aircraft guns, predicting mechanism comprising a vector mechanism settable according to the course and speed of an aerial target, a component measuring member operable thereby proportionately to the target's speed component in a vertical sight plane, means for establishing the average component velocity of a projectile in a horizontal plane, mechanism co-acting with said member and said means to effect a division of the value of the target's speed in the vertical sight plane by that of said average component velocity of the projectile and means for measuring and adding to the resultant quotient the value of the cosine of the azimuthal deflection of a line of sight during the time of flight of the projectile.

13. In a fire control system for anti-aircraft guns, predicting mechanism comprising a vector mechanism settable according to the course and speed of an aerial target, a component measuring member operable thereby proportionately to the target's speed component perpendicular to a vertical sight plane, means to establish the average component velocity of a projectile in a horizontal plane, and mechanism co-acting with said member and said means to effect a division of the value of the target's speed perpendicularly to the vertical sight plane by the value of said average component velocity of the projectile in a horizontal plane.

14. In a fire control system for anti-aircraft guns, predicting mechanism comprising a mechanical vector establishing means settable according to the course and speed of an aerial target, means coacting therewith including a member operable proportionately to the component of the target's speed perpendicular to a vertical sight plane, means to establish the average component velocity of a projectile in a horizontal plane, mechanism co-acting with the last named means and said member to effect a division of the value of the target's speed component perpendicular to the vertical sight plane by that of said average component velocity of the projectile, and a trigonometrical device responsive thereto to measure the sine of the angle of azimuthal deflection of a line of sight to the target during the time of flight of the projectile.

15. In a fire control system for anti-aircraft guns, predicting mechanism comprising co-acting elements including a displaceable member movable proportionately to the value of a target's speed in a vertical sight plane divided by the value of the average component velocity of a projectile in a horizontal plane, means operable in accordance with the measure of the sine of the angle of azimuthal deflection of a line of sight to the target during the time of flight of a projectile fired thereat, an element adjustable thereby proportionately to the cosine of that angle, a floating element articulated with the last named element and displaceable member, and means actuated thereby proportionately to the value of the speed of the target in the vertical sight plane divided by that of said average component velocity of the projectile plus the value of the cosine of said angle of deflection.

16. In a fire control system for anti-aircraft guns, predicting mechanism comprising an element linearly displaceable proportionately to the value of the speed in a vertical sight plane of an aerial target, divided by the value of the average component in a horizontal plane of a projectile fired thereat plus the value of the cosine of the angle of azimuthal deflection of a line of sight to the target during the time of flight of the projectile, a slidable member responsive to said element and angularly displaceable in accordance with the angle of the line of sight to the target, a pivoted arm, a connection between said member and arm capable of turning the latter, mutually meshing gearing revoluble about the axes of said member and arm arranged so the ratio of the cotangent of the angle of sight and the cotangent of that angle plus the swing of said arm is proportional to the distance of said element from the axis of said arm on a scale wherein the separation of said axes is unity.

17. In a fire control system for anti-aircraft guns, predicting mechanism, comprising a vector mechanism settable according to the apparent course and speed of an aerial target, a component measuring member operable therewith proportionately to the target's apparent speed in a vertical sight plane, a device adapted to be set in correspondence to the height of the target, an element responsive to said member and device displaceable according to the component angular velocity of a line of sight to the target in the vertical plane, and trigonometric means co-acting with said member, device and element and operable proportionately to the square of the sine of the present angle of sight to the target, the actuation of said member being to that of said device as the actuation of said element is to that of said trigonometric means.

18. In a fire control system for anti-aircraft guns, predicting mechanism comprising a vector mechanism settable according to the apparent course and speed of an aerial target, a component measuring member operable therewith proportionately to the target's apparent speed perpendicular to a vertical sight plane, a device adapted to be set in correspondence to the height of the target, an element responsive to said member and device displaceable according to the component angular velocity in azimuthal of a line of sight to the target, and trigonometric means co-acting with said member, device and element and operable proportionately to the tangent of the present angle of the line of sight, the actuation of said member being to that of said device as the actuation of said element is to that of said trigonometric means.

19. A fire control system for anti-aircraft guns comprising a mechanical vector settable in accordance with the apparent course and speed of the target, a second mechanical vector settable in accordance with the velocity and direction of the wind, and a third mechanical vector operatively linked to said first and second mechanical vectors so as to receive therefrom an adjustment in accordance with the course and speed of the target in relation to the air.

20. A fire control system for anti-aircraft guns comprising a predictor incorporating a plurality of mechanical vectors comprising crank pins settable in radius and phase and operatively connected by pantagraphs pivoted on said pins.

21. A fire control system for anti-aircraft guns comprising a predictor mechanism having members operable in accordance with the present elevation of a target, other members actuable in accordance with the elevation of the future target position relatively to the air at the end of a predetermined time interval, an indicator to indicate the quadrant elevation for a gun appropriate to said future target position, a member adjustable in proportion to the component of relative wind between gun and air in the vertical plane through said future target position, a linkage between said member and quadrant elevation indicator for adjusting said indicator in accordance with movements of the member, said linkage having a variable part, an element actuable in accordance with the indications of said indicator and a second element actuated by said first element and connected to said variable part to vary the motion conveyed from said adjustable member to said indicator.

22. A fire control system comprising an indicator of the angle of gun bearing appropriate to the future position of a target, a member movable in proportion to the quadrant elevation of a gun appropriate to said future position, a second member adjustable in proportion to the component of relative wind between the gun and air at right angles to a vertical plane through the gun and said future target position, a linkage having a variable part for conveying motion from said second member to said indicator in a ratio varying with movement of said second part, and means associated with said first member and operatively connected to said variable part to vary the ratio of said conveyed motion.

23. In a fire control system for anti-aircraft guns, predictor mechanism comprising a member movable in proportion to an angle of quadrant elevation of a gun, a vector element settable in accordance with the direction and velocity of the wind relatively to the gun, a second element actuated by said vector element in proportion to the component of said relative wind in the vertical plane of the gun axis, means having a variable part for conveying motion from said second element to said quadrant elevation member, means operable in accordance with said quadrant elevation and coacting means adapted to actuate said variable part in proportion to the quotient of the sine of said quadrant elevation divided by the muzzle velocity of a shell fired from the gun so as to vary the motion conveyed from said second element to said quadrant elevation member in accordance with said quotient.

24. In a fire control system for anti-aircraft guns, predictor mechanism comprising a member and means to set the same in proportion to an angle of elevation for a gun, and means to correct the setting of said member to compensate the effect of wind on the trajectory of the shell, said last means comprising a member adjustable in proportion to the direction and velocity of the wind relatively to the gun, other means adjustable in proportion to a function of the muzzle velocity of the shell and the quadrant elevation of the gun, and differential means actuated partly by said last member and partly by said last means for varying the setting of said first member.

25. The combination with a ship's gyrocompass and a device mounted on the ship and adapted to be trained relatively to the ship, of a mechanism comprising three rotary vector elements adapted to be set independently in radius and phase, a mechanical linkage interconnecting said three vector elements so that the setting of any one of them represents in radius and phase the resultant of the settings of the other two, differential means operatively responsive to said gyrocompass and trainable device and operatively connected to said three vector elements to rotate the same through an angle corresponding to the compass bearing of the trainable device.

26. In a fire control system for anti-aircraft guns, predicting mechanism comprising a plurality of vector elements adapted to be set in radius and phase to represent respectively the apparent speed and course of an aerial target, velocity and direction of the wind, target speed and course relatively to the air, and a linkage mechanism connecting said three elements for moving any one of them in radius and phase in accordance with the resultant of settings applied to the other two elements.

27. In a fire control system for anti-aircraft guns, predicting mechanism comprising a plurality of vector elements adapted to be set in radius and phase to represent respectively the direction and velocity of the wind relatively to the earth, the direction and velocity of translational movement of a gun relatively to the earth, and the direction and velocity of the wind relatively to the moving gun, and a mechanical linkage interconnecting said three elements for moving any one of them in radius and phase in accordance with the resultant of settings applied to the other two.

28. In a fire control system for anti-aircraft guns, predicting mechanism comprising a plurality of vector elements adapted to be set in radius and phase to represent respectively the apparent speed and course of a target relatively to a gun, velocity and direction of the wind relatively to the earth, target speed and course relatively to the air, direction and velocity of translational movement of the gun, and direction and velocity of relative wind between air and gun, a linkage mechanism interconnecting said first, third and fifth vector elements so that the position of any one of them represents the resultant of the settings of the other two, and a similar linkage interconnecting said second, fourth and fifth vector elements, whereby of said first four elements the setting of any one is the resultant of the settings of the other three.

29. Predictor mechanism for use in combination with anti-aircraft gun, comprising mechanism settable in accordance with the present position of a target, other mechanism settable in accordance with the air speed and course of said target, and elements actuated by said mechanisms in accordance with the direction of the axis of a gun fired to hit said target in the absence of wind, and means to determine the angular deflection to be applied to said axis from said direction in the presence of wind in order to compensate the gyroscopic deflection of the trajectory of a shell fired from said gun, said means comprising a member settable in accordance with the velocity and direction of the wind relatively to the gun and a mechanism actuated by said last member and said elements in accordance with the angular deviation between said direction and the direction of the relative velocity between the air and said shell at the muzzle of the gun.

30. Predictor mechanism comprising members movable respectively in proportion to the present and future elevations of a target, a cotangent mechanism comprising an Oldham coupling and a link associated therewith swinging through an angle proportional to the difference between the cotangents of said angles of elevation whereby infinite values of cotangents are avoided.

31. Predictor mechanism for calculating the angle of bearing of an anti-aircraft gun required to hit a given aerial target, comprising parts settable in accordance with the present position of the target, an element settable in accordance with the speed and course of the target relatively to the air, a second element actuable in accordance with a function of the time of flight of a shell fired from the gun to hit the target, and a third element actuated by said first and second elements in accordance with the angle of bearing of the future position of the target relatively to the air at the end of said time of flight, a member settable in accordance with the direction and velocity of the wind relatively to the gun, a second member actuable in accordance with a function of the quadrant elevation appropriate to said future target position, and a third member actuated by said first and second members in accordance with the azimuthal deflection of the shell relatively to the air due to wind, and an indicator of gun bearing actuated differentially by said third element and said third member.

32. Predictor mechanism for calculating the angle of elevation of an anti-aircraft gun required to hit a given aerial target, comprising parts settable in accordance with the present position of the target, an element settable in accordance with the speed and course of the target relatively to the air, a second element actuable in accordance with a function of the time of flight of a shell fired from the gun to hit the target, and a third element actuated by said first and second elements and one of said parts in accordance with the angular elevation of said future target position, a member settable in accordance with the direction and velocity of the wind relatively to the gun, a second member actuable in accordance with a function of the quadrant elevation appropriate to said future target position, and a third member actuated by said first and second members in proportion to the vertical angular deflection of the shell relatively to the air due to wind, and an indicator of gun elevation actuated partly by said third element and partly by said third member.

33. In a fire control system for anti-aircraft guns predictor mechanism comprising parts movable in accordance with the angles of elevation and training of a gun aimed to hit a target in the absence of wind, and other parts movable in proportion to the horizontal and vertical components of the angular deviation between the axis of said gun and the direction of the relative velocity between shell and air at the muzzle of the gun in the presence of wind.

34. In a fire control system for anti-aircraft guns predictor mechanism comprising a part movable in accordance with the angle of train of a gun to hit a given target in the absence of wind, a second part movable in accordance with the azimuthal difference between the vertical plane of said gun when so trained and the vertical plane of the line of relative velocity between shell and air at the muzzle of the gun in the presence of wind, and a gun training indicator operated in accordance with the algebraic sum of the movements of said first and second parts.

35. In a fire control system for anti-aircraft guns predictor mechanism comprising a part movable in accordance with the elevation of the future position of the target in the absence of wind at the end of the time of flight of a shell fired from a gun to hit said target, a second part movable in accordance with the elevation of the axis of said gun in firing said shell, a third part movable in accordance with the vertical component of the angular difference between said axis and the line of relative velocity between shell and air at the muzzle of the gun in the presence of wind, and a gun elevation indicator actuated in accordance with the algebraic sum of the movements of said second and third parts.

36. In a fire control system for anti-aircraft guns predictor mechanism comprising means for determining the angular velocity in azimuth of the line of sight to the target, said means comprising an element movable in proportion to the component linear speed of the target at right angles to the present line of sight, a second element movable in proportion to the tangent of the angle of elevation of said line of sight, and a third element movable in proportion to the height of the target, and an indicator of angular velocity in azimuth actuated in accordance with the product of the movements of said first and second elements divided by the movement of said third element.

37. In a fire control system for anti-aircraft guns predictor mechanism comprising means to determine the angular velocity in elevation of the line of sight to a target, said means comprising an element movable in proportion to the component of the linear speed of the target in the vertical plane of said line of sight, a second element movable in accordance with the square of the sine of the angle of elevation of said line of sight, a third element movable in accordance with the height of the target, and an indicator of angular velocity in elevation actuated in accordance with the product of the movements of said first and second elements divided by the movement of said third element.

38. In a fire control system for anti-aircraft guns predictor mechanism comprising means to determine the bearing of the future target position at the end of the time of flight of a shell fired to hit said target, said means comprising an element movable in proportion to the component of the linear speed of the target at right angles to the line of sight to the target, a second element movable in proportion to the average horizontal velocity of said shell, and a third element operatively connected to said first and second elements and moved thereby through an angle whose sine is equal to the movement of the first element divided by that of said second element.

39. In a fire control system for anti-aircraft guns predictor mechanism comprising a mechanism settable in proportion to the speed and course of a target, a second mechanism settable in proportion to the component angular velocities of the target in azimuth and elevation, a third mechanism for calculating the future position of the target after a predetermined time interval, actuating means for applying settings to each of said first and second mechanisms and operative connections between said three mechanisms whereby said first mechanism provides a check indication when the third mechanism is operated by settings applied to the second mechanism and the second mechanism provides a check indication when the third mechanism is operated by settings applied to said first mechanism.

JAMES BLACKLOCK HENDERSON.
ARTHUR LEONARD PERHAM.